United States Patent
Shimamoto et al.

(12)

(10) Patent No.: US 6,336,944 B1
(45) Date of Patent: Jan. 8, 2002

(54) METHOD OF MANUFACTURING SOLID ELECTROLYTIC CAPACITORS

(75) Inventors: Yukari Shimamoto, Kyoto; Kazuyo Saito, Hirakata, both of (JP)

(73) Assignee: Matsushita Electric Industrial Co., Ltd. (JP)

( * ) Notice: Subject to any disclaimer, the term of this patent is extended or adjusted under 35 U.S.C. 154(b) by 0 days.

(21) Appl. No.: 09/493,002

(22) Filed: Jan. 28, 2000

(30) Foreign Application Priority Data

Jan. 28, 1999 (JP) ............................................. 11-019486

(51) Int. Cl.$^7$ ............................ H01G 9/00; H01G 9/02; B05D 5/21
(52) U.S. Cl. ...................... 29/25.03; 361/523; 361/524; 361/525; 427/80
(58) Field of Search .................. 29/25.03, 25.01–25.02; 361/523.4, 525; 427/80

(56) References Cited

U.S. PATENT DOCUMENTS 5,117,332 A * 5/1992 Kudoh et al. ................ 361/525
6,110,235 A * 8/2000 Araki et al. ................ 29/25.03

FOREIGN PATENT DOCUMENTS

JP          63-181310     7/1988
JP          3-178117      8/1991

* cited by examiner

Primary Examiner—Ha Tran Nguyen
(74) Attorney, Agent, or Firm—Parkhurst & Wendel, L.L.P.

(57) ABSTRACT

A method of manufacturing solid electrolytic capacitors by forming an anodized film on a surface of a valve metal anode; forming a capacitor element by adhering an insulating resist tape on said anodized film for separating a negative electrode part and a positive electrode part; forming a $MnO_2$ layer by immersing the capacitor element in a solution containing manganese salts, removing the capacitor element from the solution, and thermally decomposing attached manganese salts; immersing the capacitor element on which the $MnO_2$ layer is formed in an organic polar solvent or aqueous solution thereof; re-anodizing the capacitor element by immersing the capacitor element in an electrolytic solution before the organic polar solvent or its solution dries; and forming a solid electrolyte layer and cathode conductor layer on the base layer. This method provides solid electrolytic capacitors which demonstrate less change in leak current at high temperature and high humidity, and good impedance characteristics at high frequencies.

2 Claims, No Drawings

METHOD OF MANUFACTURING SOLID ELECTROLYTIC CAPACITORS

FIELD OF THE INVENTION

The present invention relates to manufacturing a solid electrolytic capacitor having a valve metal on which an anodized film is formed as an anode.

BACKGROUND OF THE INVENTION

In conventional methods of manufacturing solid electrolytic capacitors (hereafter referred to as "solid capacitors"), an anodized film, base layer, conductive polymer layer, and cathode conductor layer are successively formed on the surface of a foil or fine powder sintered body of valve metal which becomes an anode, that is a positive electrode. After lead wires are connected to a capacitor element, it is molded with a packaging resin to complete the solid capacitor. In general, a $MnO_2$ layer is used as a base layer in this series of manufacturing processes. As the $MnO_2$ layer is usually formed by thermally decomposing manganese nitrate, the anodized film is significantly damaged when aluminum is used as the anode, causing large leak current in the completed solid capacitors.

For solving the above problem, Japanese Laid-open Patents Nos. S63-181310 and H2-260516 disclose re-anodization in electrolytic solution after forming the conductive polymer layer. Japanese Laid-open Patent No. H3-178117 also discloses a method of forming a conductive polymer layer on the $MnO_2$ layer after adhering an insulating resist tape on the anodized film to separate a cathode, that is a negative electrode and anode, and then forming the $MnO_2$ layer by thermal decomposition.

These conventional methods disclosed in Japanese Laid-open Patent Nos. S63-181310 and H2-260516 involve re-anodization after forming a conductive polymer layer in the electrolytic solution. The electrolytic solution is thus difficult to sufficiently provide on the anodized film, making this process insufficient for fully repairing any damage to the anodized film. In addition, the conductive polymer layer sometimes degrades under some anodizing conditions, resulting in unsatisfactory impedance characteristics.

The conventional method disclosed in the Japanese Laid-open Patent No. H3-178117 requires re-anodization after formation of the $MnO_2$ layer by thermal decomposition. Otherwise, the significantly damaged anodized film permits the flow of large leak current. In addition, even if re-anodization is implemented, adhesives on the resist tape seep out and interfere with the repairability of defective portions of the anodized film near the resist tape.

SUMMARY OF THE INVENTION

The present invention addresses the above disadvantages of conventional methods, and provides a method of manufacturing solid electrolytic capacitors with less leak current and good impedance characteristics.

The method of manufacturing solid capacitors of the present invention comprises:

- forming an anodized film on the surface of a valve metal anode body;
- separating a cathode part and anode part on the anodized film;
- forming a base layer for a solid electrolyte layer on the anodized film;
- immersing a capacitor element on which the base layer is formed into an organic polar solvent or solution thereof;
- removing the capacitor element from the organic polar solvent or solution thereof, and immersing it in an electrolytic solution before the solvent or its solution dries up, for re-anodization; and
- forming a solid electrolyte layer and cathode conductor layer on the base layer.

Furthermore, the method of manufacturing solid capacitors of the present invention comprises:

- forming an anodized film on the surface of the anode which comprises a valve metal;
- adhering an insulating resist tape for separating a cathode part and an anode part on the anodized film;
- immersing a capacitor element on which the insulating resist tape is adhered into a solution comprising dissolved manganese salts;
- removing the capacitor element from the solution and forming a $MnO_2$ layer by thermally decomposing the manganese salts on the capacitor element;
- immersing the capacitor element in an organic polar solvent or solution thereof;
- removing it from the organic polar solvent or solution thereof and immersing it in an electrolytic solution, before the solvent or solution thereof dries, for re-anodization; and
- forming a solid electrolyte layer and cathode conductor layer on the base layer.

Accordingly, wettability of the cathode in the re-anodization process improves, and small defects on the anodized film can be repaired. The present invention thus provides solid capacitors with less leak current.

DESCRIPTION OF PREFERRED EMBODIMENTS

Exemplary embodiments of the present invention are described below. However, it is apparent that the present invention is not limited to these exemplary embodiments.

First Exemplary Embodiment

An insulating resist tape is adhered onto an aluminum foil to separate a cathode part and an anode part after electrolytic etching of the aluminum foil. The effective area of the anode body of a capacitor element is set to 3.0 mm×4.0 mm, and this is immersed in a solution containing 5 weight percent of ammonium adipate at a liquid temperature of 70° C. A 12 V DC voltage is then applied for 20 minutes to form an anodized film. This anode body is then immersed in manganese nitrate solution, and attached manganese salts are thermally decomposed at 300° C. for 5 minutes to form a $MnO_2$ layer on the surface of the anode body.

The anode body is then immersed in a aqueous solution containing 6 weight percent of 1-butanol. Before the solution dries, the anode body is immersed in an aqueous solution containing 5 weight percent of ammonium adipate at 70° C. liquid temperature, and a 10 V DC voltage is applied for 10 minutes for re-anodization. After these processes are complete, a conductive polymer layer comprising a polypyrrole film is formed on the $MnO_2$ layer using the electrolytic polymerization method. Graphite paste on an aqueous suspension thereof and silver paste are subsequently applied to this conductive polymer layer to form a cathode conductor layer. After connecting lead wires to this anode body, the capacitor element is molded in packaging resin to complete a solid capacitor.

Second Exemplary Embodiment

A second exemplary embodiment employs a solution comprising 25 weight percent of isopropyl alcohol aqueous solution instead of the 1-butanol aqueous solution described in the first exemplary embodiment. Other methods are the same as those in the first exemplary embodiment for manufacturing a solid capacitor.

Third Exemplary Embodiment

In a third exemplary embodiment, the anode body is immersed in the isopropyl alcohol aqueous solution for 5 seconds. Other methods are the same as those in the second exemplary embodiment for manufacturing a solid capacitor.

Fourth Exemplary Embodiment

A fourth exemplary embodiment employs a solution comprising 25 weight percent of acetonitril aqueous solution instead of the 1-buthanol solution in the first exemplary embodiment. Other methods are the same as those in the first exemplary embodiment for manufacturing a solid capacitor.

Comparative Example

A comparative solid capacitor is manufactured using the same steps as the first exemplary embodiment but without the step of immersing the anode body in the 1-butanol aqueous solution after thermal decomposition.

Table 1 shows the initial characteristics of the solid capacitor in accordance with the first through fourth exemplary embodiments and a comparative example. The characteristics of the capacitor were measured at 25 to 30° C, the capacity and tan (delta) at 120 Hz, and impedance at 400 kHz. Leak current was measured 30 seconds after applying 6.3 V DC. Table 1 shows the mean value of n=30 test pieces.

TABLE 1

|  | Capacitance | Tan δ | Impedance (milliohms) | Leak Current (nA) |
|---|---|---|---|---|
| First embodiment | 12.3 | 1.0 | 58 | 177 |
| Second embodiment | 12.4 | 0.8 | 61 | 165 |
| Third embodiment | 12.4 | 0.9 | 57 | 132 |
| Fourth embodiment | 12.5 | 0.9 | 63 | 151 |
| Comparative example | 12.1 | 1.2 | 69 | 890 |

Table 2 shows the mean value of five solid electrolytic capacitors each from the first through the fourth exemplary embodiments and comparative example. The initial leak current and leak current were measured after keeping the test pieces under high temperature and high humidity conditions of 85° C. and 85% RH for 500 hours without load. Leak current was measured at 25 to 30° C. thirty seconds after applying a 6.3 V DC voltage.

TABLE 2

|  | Leak current (nA) | |
|---|---|---|
|  | Initial value | after test |
| First embodiment | 183 | 704 |
| Second embodiment | 150 | 640 |
| Third embodiment | 125 | 511 |
| Fourth embodiment | 156 | 585 |
| Comparative example | 1002 | 11208 |

It is apparent from Tables 1 and 2 that the manufacturing method of solid capacitors described in the first through fourth exemplary embodiments has better capability to suppress an increase in leak current during production, compared to that of the comparative example.

In addition, solid capacitors manufactured according to the method described in the first through fourth exemplary embodiments show less increase in leak current after being left in unloaded condition in a high temperature and high humidity environment.

More specifically, the solid capacitors of the present invention are manufactured by immersing a capacitor element onto which a $MnO_2$ layer has been formed from an organic polar solvent or solution thereof, immersing the capacitor element in electrolytic solution before the organic polar solvent or solution thereof dries, for re-anodization, and then forming electrolyte on the $MnO_2$ layer. This reduces the detrimental effect on wettability of a portion of the cathode due to seepage of adhesives from the resist tape during thermal decomposition of manganese salts.

Furthermore, electrolytic solution is uniformly supplied to the entire cathode during re-anodization, and fine defects may thus be repaired, forming a high quality anodized film. Accordingly, the present invention suppresses increase in leak current during production, and reduces increase in leak current in solid capacitors kept at high temperature and high humidity without load.

As described above, the manufacturing method of the present invention suppresses increase in leak current during the manufacture of solid capacitors. In addition, the present invention reduces increase in leak current when the solid capacitor is kept at high temperature and high humidity without load. The manufacturing method of the present invention forms the $MnO_2$ layer on every portion of the anodized film, enabling production of solid capacitors with low impedance at high frequencies.

The exemplary embodiments also describe forming the $MnO_2$ layer as a base layer for the conductive polymer layer. However, other than $MnO_2$, conductive or semiconductive metal oxides including tin, zinc, tungsten, nickel, and vanadium may be used independently or as composite oxides for the base layer. If a non-aqueous solvent is used, a highly conductive metal oxide such as ruthenium oxide may also be used.

The exemplary embodiments also describe using aluminum as a valve metal. Other than aluminum, titanium, tantalum, and other valve metals are applicable to the manufacturing method of the present invention.

Furthermore, the exemplary embodiments describe employing an aluminum foil. However, other than foil, the present invention is also applicable to capacitor elements made of fine powder sintered bodies or other equivalent methods.

What is claimed is:

1. A method of manufacturing solid electrolytic capacitors, said method comprising:

forming an anodized film on a surface of an anode comprising a valve metal;

forming a capacitor element by adhering on said anodized film an insulating resist tape for separating cathode and anode;

forming a $MnO_2$ layer by immersing said capacitor element in a solution containing dissolved manganese salts, removing said capacitor element from said solution, and thermally decomposing manganese salts on said capacitor element;

immersing said capacitor element on which said $MnO_2$ layer is formed in an organic polar solvent or an aqueous solution thereof;

re-anodizing said capacitor element by immersing said capacitor element in an electrolytic solution before said organic polar solvents or solution thereof dries; and forming a solid electrolyte layer and cathode conductor layer on said $MnO_2$ layer.

2. The method of manufacturing solid electrolytic capacitors of claim 1, wherein said organic polar solvent is soluble in water.

* * * * *

UNITED STATES PATENT AND TRADEMARK OFFICE
CERTIFICATE OF CORRECTION

PATENT NO. : 6,336,944 B1  Page 1 of 1
DATED : January 8, 2002
INVENTOR(S) : Yukari Shimamoto and Kazuyo Saito It is certified that error appears in the above-identified patent and that said Letters Patent is hereby corrected as shown below:

<u>Title page, Item [54] and Column 1, lines 1-2,</u>
Change "METHOD OF MANUFACTURING SOLID ELECTROLYTIC CAPACITORS" to -- METHOD OF RE-ANODIZING SOLID ELECTROLYTIC CAPACITORS HAVING $MnO_2$ AND SOLID ELECTROLYTE LAYERS --.

Signed and Sealed this

Twenty-fourth Day of September, 2002

*Attest:*

*Attesting Officer*

JAMES E. ROGAN
*Director of the United States Patent and Trademark Office*